United States Patent [19]

Carlomagno

[11] 4,451,965
[45] Jun. 5, 1984

[54] METHOD FOR INSTALLING A SLEEVE ON A SUBSTRATE

[75] Inventor: William D. Carlomagno, Redwood City, Calif.

[73] Assignee: Raychem Corporation, Menlo Park, Calif.

[21] Appl. No.: 419,805

[22] Filed: Sep. 20, 1982

Related U.S. Application Data

[62] Division of Ser. No. 114,617, Jan. 23, 1980, Pat. No. 4,365,400.

[51] Int. Cl.$^3$ ............................................. B23P 15/00
[52] U.S. Cl. ....................................... 29/450; 29/745; 29/855
[58] Field of Search .................. 29/450, 235, 745, 758, 29/855, 883

[56] References Cited

U.S. PATENT DOCUMENTS

| | | | |
|---|---|---|---|
| 2,379,508 | 7/1945 | Dodge | 29/235 |
| 2,668,614 | 2/1954 | Lawson | 198/746 |
| 2,717,072 | 9/1955 | Andrews et al. | 72/281 |
| 2,932,338 | 4/1960 | Franck | 72/317 |
| 3,155,136 | 11/1964 | Laskowski | 29/753 |
| 3,184,950 | 5/1965 | Sitz | 72/331 |
| 3,347,083 | 10/1967 | Turpin et al. | 29/235 |
| 3,376,627 | 4/1968 | Sitz | 29/563 |
| 3,774,284 | 11/1973 | Cootes | 29/753 |
| 3,781,985 | 1/1974 | Yonkers | 29/235 |
| 3,826,349 | 7/1974 | Stevenson | 198/744 |
| 3,894,731 | 7/1975 | Evans | 269/47 |
| 4,028,795 | 6/1977 | Takahashi | 29/403.2 |
| 4,034,450 | 7/1977 | Carlomagno et al. | 29/745 |
| 4,114,253 | 9/1978 | Loomis et al. | 29/753 |
| 4,129,941 | 12/1978 | Zahn | 29/753 |
| 4,139,937 | 2/1979 | L'Homme | 29/450 |
| 4,162,724 | 7/1979 | Shinjo | 198/746 |

FOREIGN PATENT DOCUMENTS 893757 4/1962 United Kingdom ................. 29/450

Primary Examiner—Daniel C. Crane

[57] ABSTRACT

An apparatus is provided for installing sleeves onto elongated substrates such as electrical wiring or cable, where the sleeves are slideably arranged on fingers extending from a carrier belt. The apparatus includes a base having a belt path for receiving the carrier belt and a finger guideway for receiving a finger of the carrier belt. Stripping means are slideably mounted on the base for forcing a sleeve from a finger onto a substrate. An indexing element is provided for moving the carrier belt to a position so that a finger having a sleeve arranged thereon is in the finger guideway each time after a sleeve is stripped from a finger. In use of the device, the sleeve can be stripped from a finger into the die in two stages, where an elongate substrate is inserted into the removed portion of the sleeve between the two stages. For installing non-cylindrical sleeves on cylindrical substrates, a die is mounted to the base at a position to receive the sleeve as it is stripped from a finger. The die includes a narrow passageway for forming a sleeve into a substantially cylindrical configuration. Preferably, the die comprises at least two passageways for receiving the sleeve, the passageways being adapted for sleeves of different shape and/or material, where the die is rotatably mounted so that either of the passageways can be positioned to receive a sleeve. In use of the device, a sleeve can be stripped from a finger into the die in two stages, where an elongate substrate is inserted into the removed portion of the sleeve between the two stages.

4 Claims, 12 Drawing Figures

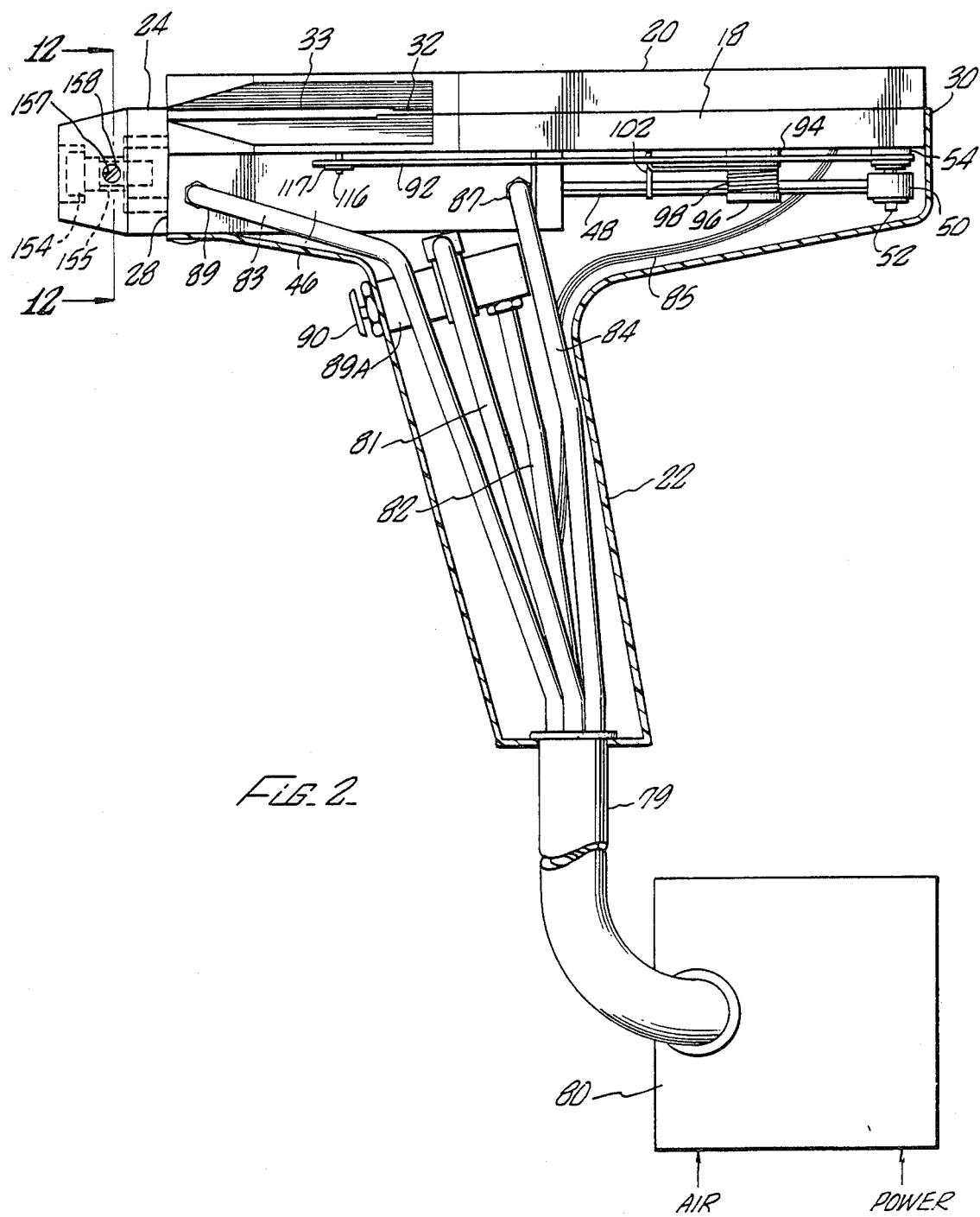

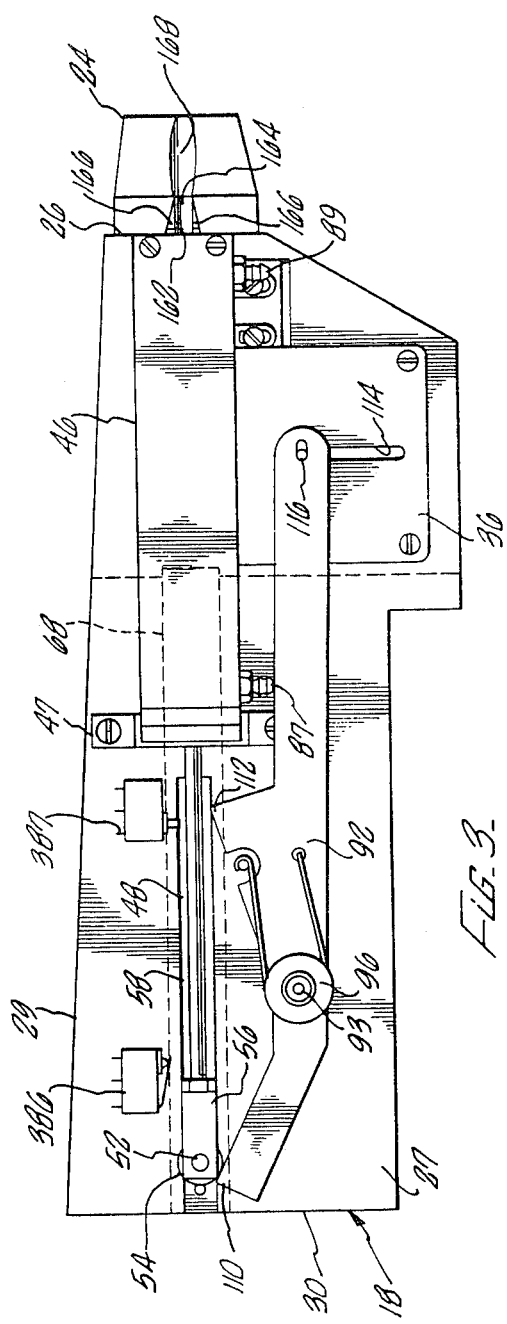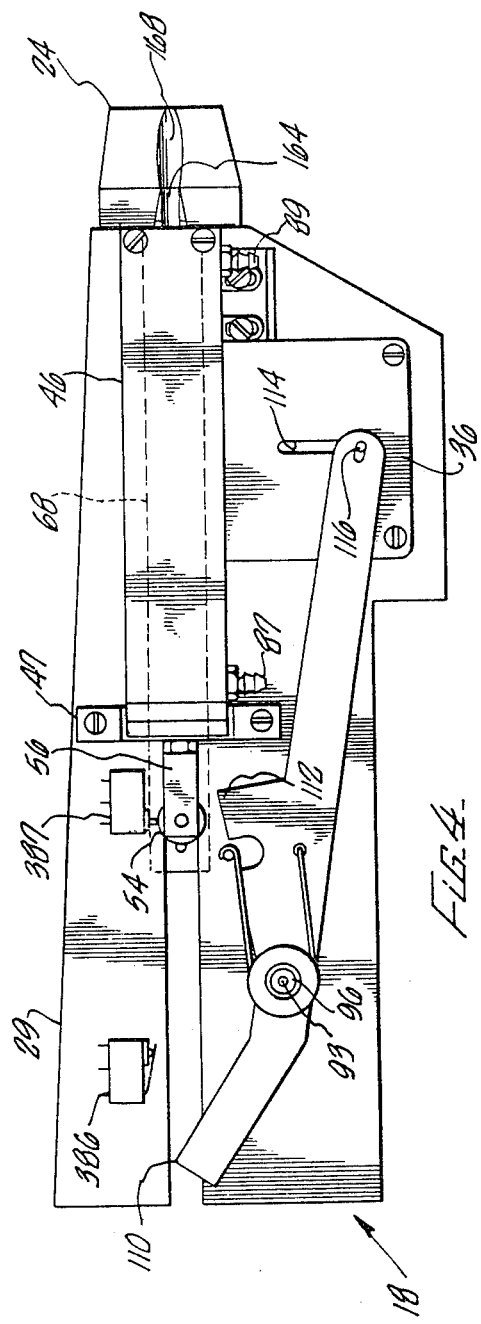

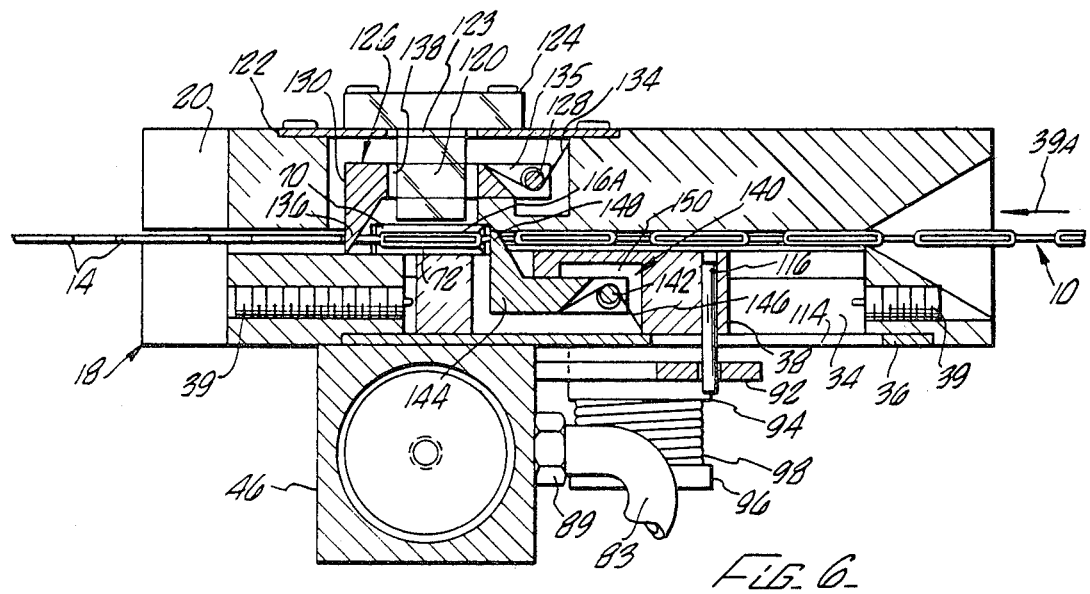
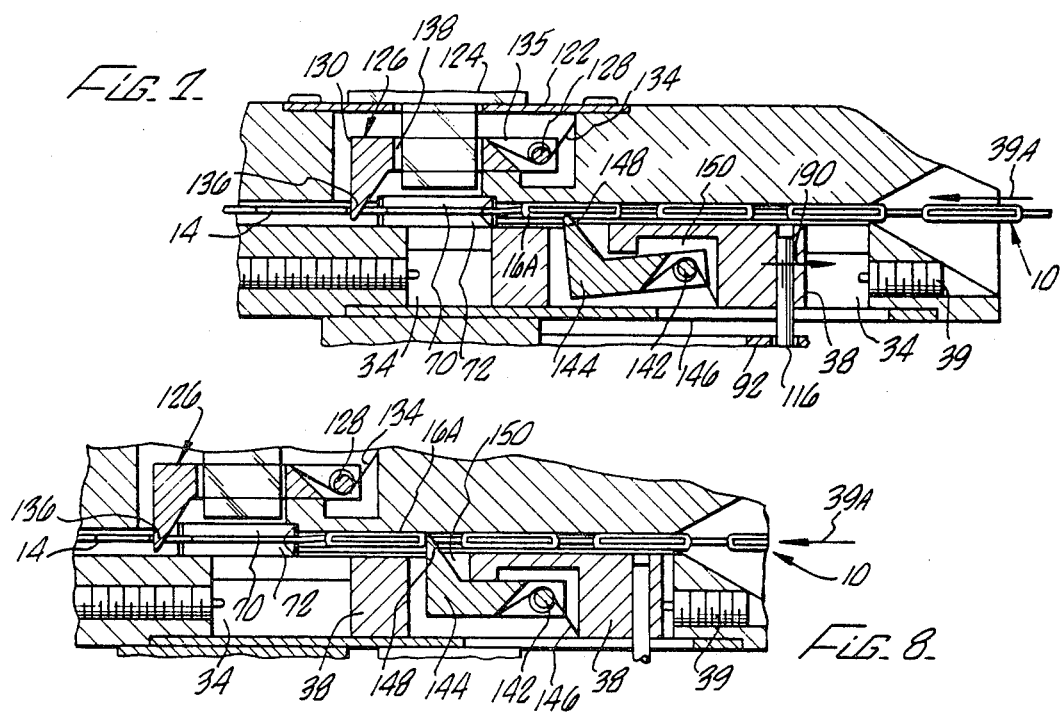
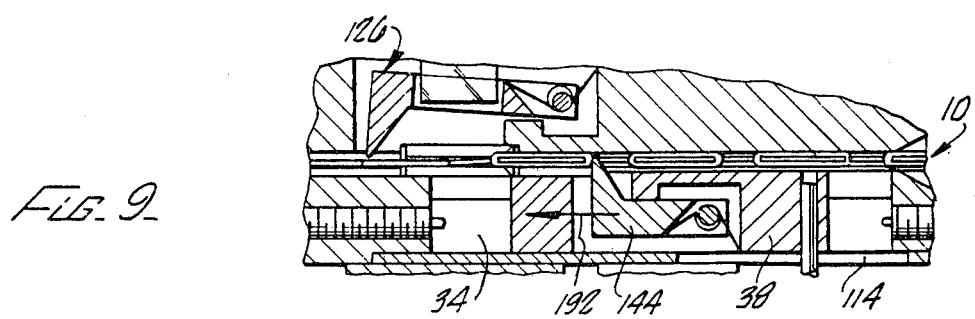

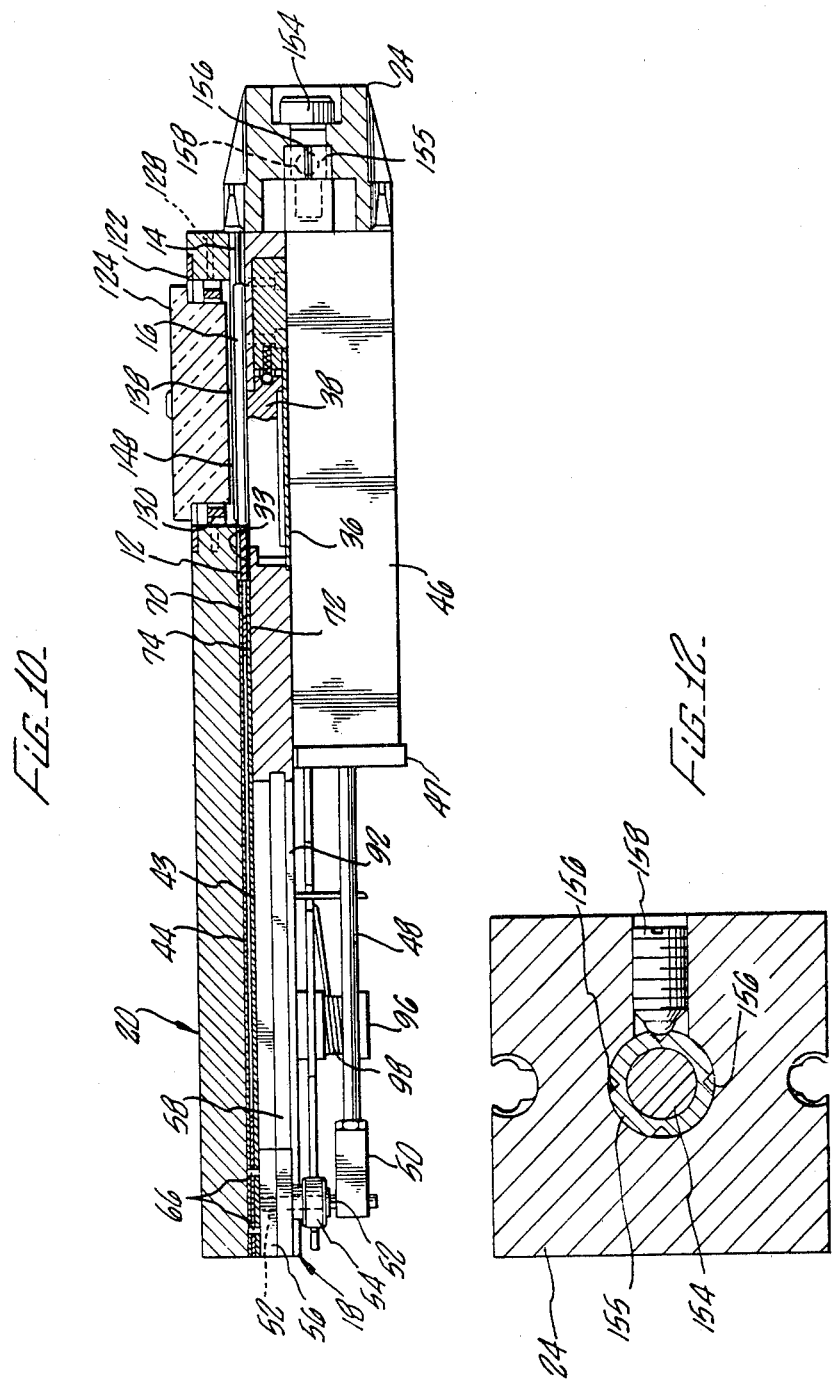

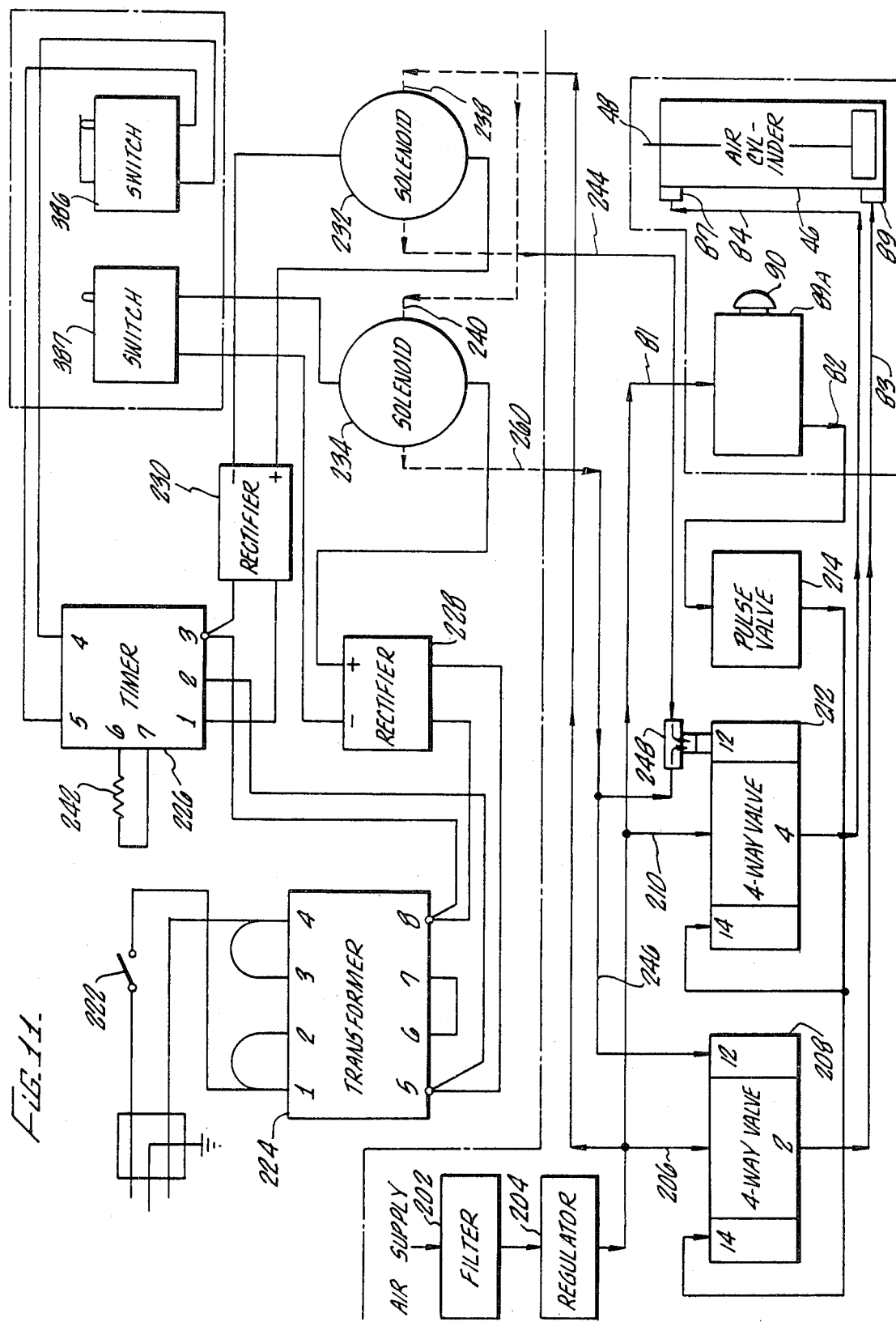

METHOD FOR INSTALLING A SLEEVE ON A SUBSTRATE

This is a division of application Ser. No. 114,617, filed 1/23/80, now U.S. Pat. No. 4,365,400.

BACKGROUND OF THE INVENTION

The present invention is directed to a mechanism for the placement of sleeves on elongated substrates such as wire-like members, including electrical wiring and cable.

With the advent of highly sophisticated and correspondingly complex electrical and electronic systems, a need has arisen for the detailed labeling of the individual wires and cables present in such a system to aid in assembly, repair and/or subsequent alteration of the electrical or electronic device. As a result of this need, flexible marker sleeves have been developed which are either color coded or include printed indicia for identification of a specific conductor. These sleeves are then positioned over the conductor are held by a variety of known methods. Naturally, the placement of such sleeves constitutes an additional step in the fabrication of the electrical or electronic component. Consequently, it is of benefit to facilitate the placement of such sleeves to reduce the cost of incorporating such convenient and often necessary marking systems.

Because of the large number of marker sleeves necessary in any complex electrical or electronic system and because of the variety of distinguishing markings required of such sleeves, it has been found advantageous to load unmarked sleeves onto fingers or holders extending from a continuous carrier belt. The sleeves are of heat recoverable material and can conveniently be positioned on the fingers in an expanded cylindrical shape. The sleeves are then at least partially heat recovered so that they are tightly and slidably arranged on the fingers. The heat recovery causes the sleeves to acquire a non-cylindrical shape such that printed indicia may be placed on these sleeves in a relatively continuous manner. Such a system is disclosed in coassigned U.S. Pat. Nos. 3,894,731 and 4,032,010, the disclosures of which are incorporated herein by reference.

A commercially successful apparatus for installing the sleeves on elongated substrates is described in coassigned U.S. Pat. No. 4,034,450, which is incorporated herein by this reference. This patent describes an apparatus for installing a plurality of sleeves simultaneously. The apparatus includes a base having a guideway for receiving the carrier belt and finger guideways for receiving fingers of the carrier belt with the non-cylindrical sleeves arranged thereon. A stripper assembly forces the sleeves from the carrier belt and a die is fixed to the base to receive the sleeves as they are stripped from the fingers, the die changing the shape of the non-cylindrical sleeves to a substantially cylindrical configuration.

Although the apparatus described in U.S. Pat. No. 4,034,450 operates satisfactorily and has achieved commercial success, it has some limitations. Because a plurality of sleeves are installed on wires simultaneously, it is bulky and non-portable. Furthermore, after the sleeves are prepared for wire installation, it is necessary to open a top cover plate in order to manually place additional sleeves in the guideways.

Another difficulty with the apparatus of U.S. Pat. No. 4,034,450 is that a particular tool is designed for a particular carrier belt and sleeve, and cannot easily be adapted for different carrier belts and sleeves. To change the material of the sleeves, the size of the sleeves, and/or the spacing between adjacent sleeves, it is often necessary for the user to purchase a new tool.

In view of these problems, there is a need for an inexpensive, portable apparatus for installing sleeves on elongated substrates such as wires, where the apparatus is easily adapted for a variety of different sleeves and does not require reloading each time after a sleeve is installed on a substrate.

SUMMARY OF THE INVENTION

The present invention is directed to an apparatus having these features. The apparatus comprises a base having a belt path for receiving a carrier belt and a finger guideway for receiving a finger of the carrier belt with a sleeve arranged thereon. Stripping means are slideably mounted on the base for slideably forcing a sleeve that is arranged on a finger within the finger guideway onto a substrate. A die is supported by the base, the die including at least one passageway adapted to receive a sleeve as it is stripped from a finger. Indexing means are provided for moving the carrier belt along the belt path each time after a sleeve is stripped from a finger. Thus, it is not necessary to manually reload the apparatus each time a sleeve is installed on a substrate.

Due to the flexibility of the sleeves, preferably the finger guideway comprises at least one guide element, and more preferably two guide elements, for maintaining a sleeve within the finger guideway as the sleeve is forced from the carrier belt finger. The guide elements are retractable so as not to interfere with the movement of the carrier belt by the indexing means.

When installing non-cylindrical sleeves arranged on non-cylindrical fingers, the passageway of the die narrows from a first section that accommodates a non-cylindrical sleeve dimension to a smaller second section having a width smaller than the width of the first section. The second section forms the sleeve into a substantially cylindrical configuration when the sleeve is forced into the passageway by the stripper means. To minimize the resistance of the passageway on movement of the sleeve means, preferably the length of the second section of each passageway is substantially shorter than the length of the sleeves. Thus, only a portion of a sleeve is formed at any one time into a cylindrical configuration.

To maximize the versatility of the apparatus, preferably the die is provided with at least two passageways adapted for sleeves of different material and/or dimensions, and the die is movably mounted so that either of the two passageways can be positioned to receive a sleeve.

For reliable, repeatable installation of the flexible sleeves, preferably the sleeves are forced from the fingers in two stages, where an elongate substrate is inserted into the removed portion of the sleeve between the two stages. Control logic can be provided for stopping forward movement of the stripping means after it has forced only the first part of the sleeve from a finger into the die. An elongate substrate is then inserted into the first part, and subsequently the remainder of the sleeve is forced from the finger onto the substrate.

In a preferred version of the present invention, the indexing means comprises a retractable indexing element mounted in the base to slide reciprocatingly in a guide path parallel to the belt path. The length of the guide path is about equal to the pitch of the carrier belt. The indexing element is adapted to fit between adjacent fingers of the carrier belt. The indexing element is retractable so that it can pass by a finger of the carrier belt as it slides to a position to index the carrier belt forward. Preferably the indexing element also serves as one of the guide elements of the finger guideway.

Because of the automatic indexing feature, the apparatus can be fabricated as a simple hand tool requiring a single guideway, where only a single sleeve is installed on a substrate at any one time. Because of the use of a die that has a plurality (at least two) of passageways, and because of the low resistance of the die passageway to movement of a sleeve, a variety of different sleeves can be accommodated by a single tool. Furthermore, preferably the length of the indexing guide path is adjustable so that carrier belts of different pitches can be accommodated with a single tool.

DRAWINGS

These and other features, aspects, and advantages of the present invention will become better understood with reference to the following description, appended claims, and accompanying drawings, where:

FIG. 2 is a side elevation view, partially in section, of the hand tool of FIG. 1, taken in direction 2—2 as shown in FIG. 1;

FIGS. 3 and 4 are bottom plan views of the hand tool of FIG. 1, taken on line 3—3 in FIG. 1, during different cycles of operation of the tool;

FIGS. 6-9 are sectional views, taken on line 6—6 of FIG. 1, during different stages of a cycle of the tool;

FIG. 10 shows in vertical section the hand tool of FIG. 1 taken on line 10—10 in FIG. 1;

Figure 1:
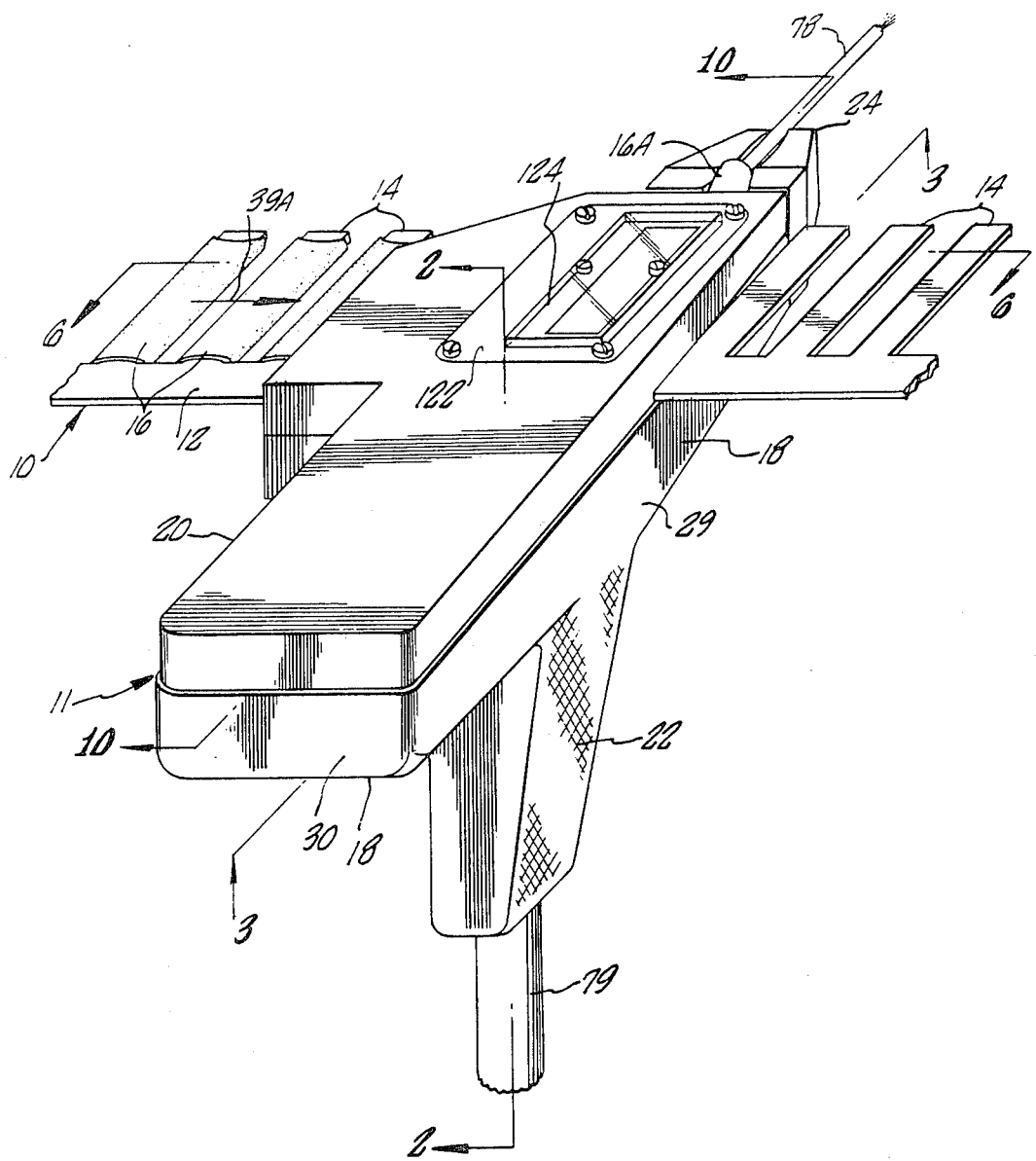
FIG. 1 is a perspective view of an apparatus according to the present invention which is suitable for use as a hand tool.

FIG. 11 schematically shows the pneumatic/electrical control system for the apparatus of FIG. 1; and FIG. 12 is a cross-section of the die of the apparatus of FIG. 1 taken on line 12—12 in FIG. 2.

DESCRIPTION OF THE INVENTION

With reference to the drawings, a carrier belt 10 is shown in place on an apparatus or hand tool 11 according to the present invention. The carrier belt 10 includes a continuous band 12 with integral fingers 14 uniformly spaced apart and extending from one side of the continuous band 12. The carrier belt 10 is usually made of a flat sheet of plastic material such as nylon. A marker sleeve 16 is tightly and slideably positioned on one of the integral fingers 14. The marker sleeves 16 assume a non-circular configuration as they tightly fit about the relatively flat integral fingers 14. A carrier belt 10 along with associated marker sleeves 16 is more fully disclosed by Evans et al in the aforementioned U.S. Pat. No. 3,894,731. The carrier belt 10 as well as the marker sleeves 16 can be any of a wide variety of embodiments for which the present tool 11 can be adapted without departing from the inventive concepts herein described. For the purpose of the present disclosure, the carrier belt 10 has a continuous band 12 that is 1.27 centimeters (0.5 in.) in width. The integral fingers 14 are 5.08 centimeters (2 in.) long and have a pitch (center-to-center spacing) of 0.914 centimeters (0.36 in.). The sleeves 16 and 3.17 centimeters (1.25 in.) long and have an inside diameter of 0.238 centimeters (0.094 in.) when forced into a cylindrical configuration.

As used herein, the directions top, bottom, front, rear, and back refer to the hand tool 11 in the orientation shown in FIG. 1. The tool 11 can be used in orientations other than shown in FIG. 1 due to its light weight and simple design.

The tool 11 comprises a base 18, top 20, knurled handle 22, and a die 24. The base 18 is shaped like a box having top 26, bottom 27, front 28, side 29, and back 30 walls. Likewise, the top 20, which is secured to the top of the base 18, is box-shaped; it extends over the entire base 18 and mates therewith. The handle 22 is secured to the bottom 27 of the base 18. The die 24 is rotatably supported at the front 28 of the base. The die 24 is mounted to the front of an air cylinder 46 mounted on the bottom wall 27 of the base 18.

The base 18 and the top 20 are spaced apart toward their front ends to form a belt path 32 for the carrier belt 10, the belt path 32 extending across the width of the base and top. The carrier belt path 32 is cut deep enough into the base and top to accommodate the thickness of the band 12. The walls of the base and top at the entrance 33 to the belt path 32 flare apart to permit easy insertion of the carrier belt 10 into the belt path 32.

Below the belt path 32 in the base is a guide path or slot 34. The guide path 34, which extends parallel to the belt path 32, is covered by a bottom cover plate 36. A slide 38 moves reciprocatingly back and forth in the guide path 34 for indexing the carrier belt 10 forward in the direction shown by arrow 39 in FIGS. 1 and 6-9, as is more fully described below. The length of the guide path 34 for the slide 38 is adjusted to be about equal to the pitch of the carrier belt by means of two screws 39, one extending through each of the opposing side walls of the base into the guide path 34. The amount of extension of the screws 39 into the guide path 34 is adjustable to control the length of path of the slide 38.

Figure 5:
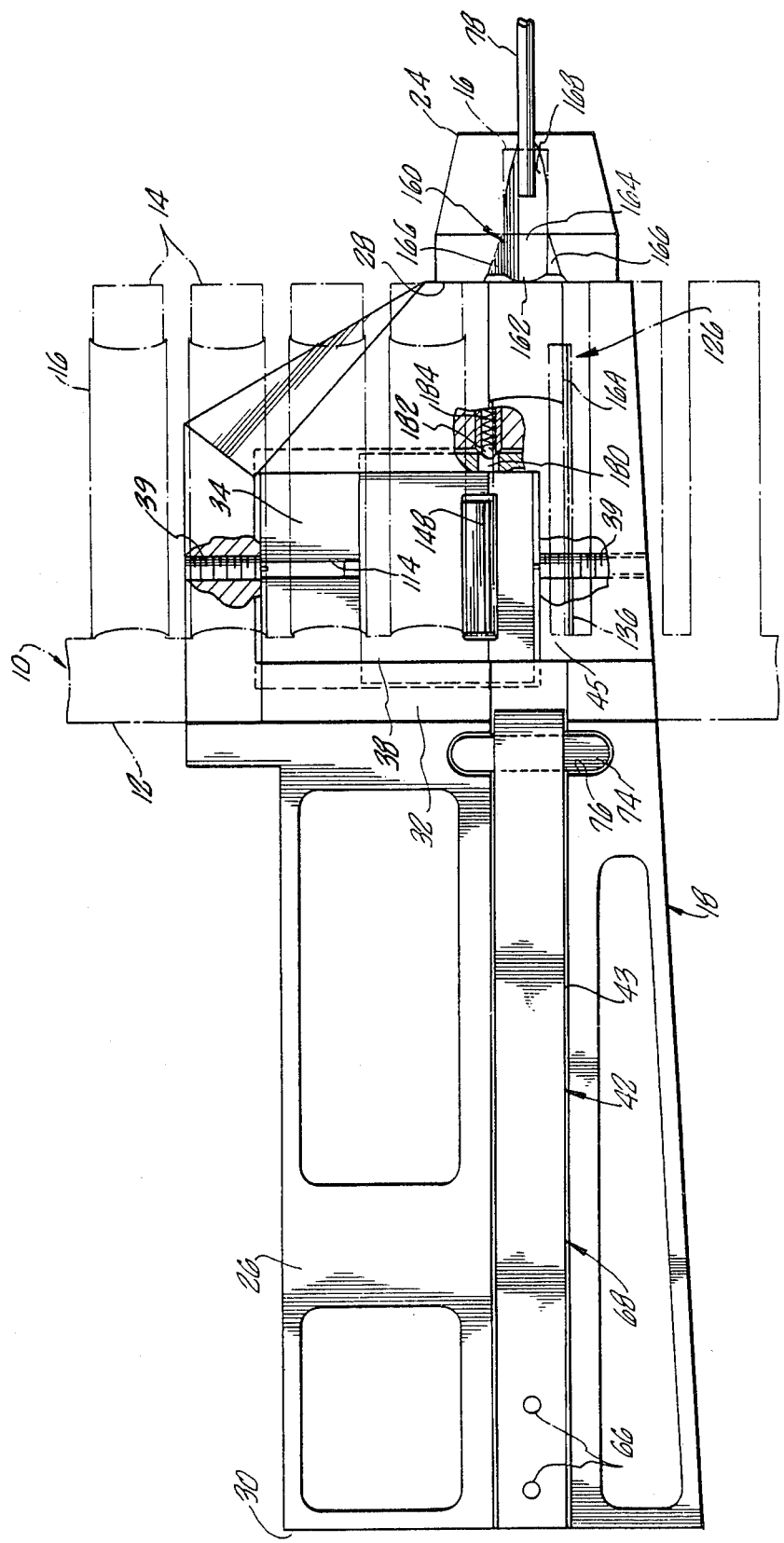
FIG. 5 is a top plan view, partially in section, of the hand tool of FIG. 1 with the top removed.

There is a longitudinal glide path 42 extending along the length of the hand tool formed by mating recesses 43 and 44 in the base and top, respectively. The front portion of the glide path 42, i.e., the portion from where the glide path intersects the carrier belt path 32 to the front end of the tool, is referred to herein as a finger guideway 45. The glide path 42, including the finger guideway 45, is cut deep enough to accommodate both the integral fingers of the carrier belt and means for pushing the sleeves off the fingers, as is more fully discussed below. The finger guideway 45 is thus deeper than the carrier belt path. As shown in FIG. 5, the recess 43 in the base in the region of the finger guideway comprises the entire right side of the upper surface of the base; i.e., the front right portion of the top surface of the base is recessed compared to the front left portion of the top surface of the base.

The means for stripping sleeves 16 off the fingers 14 comprises the cylinder 46 secured to the forward portion of the bottom wall 27 of the base 18. Cap screws are used at the front end of the cylinder 46 and a bracket 47 is used at the back end for maintaining the cylinder 46 in position. A piston rod 48 extends from the back end of the cylinder 46 and reciprocatingly moves along the longitudinal axis of the base. Secured to the back end of the piston rod 48 is a clevis 50. A pin 52, on which is mounted a bearing 54, extends upwardly from the clevis 50 into a sliding block 56, which is mounted to slide reciprocatingly in a slot 58 cut through the base along the rearward portion of the glide path 42. The sliding block 56 moves reciprocatingly in accordance with the reciprocating motion of the piston rod 48.

Two pins 66 extend upwardly from the block 56 into the glide path 42. A fork or pushing member 68 is mounted on these pins 66. The fork 68 is mounted in the glide path 42 and moves reciprocatingly therein in response to the movement of the piston rod 48. The fork serves to force sleeves 16 from the integral fingers 14 and out of the finger guideway 45 onto wire substrates. The fork comprises at the front end a pair of spaced apart tines, an upper tine 70 and a lower tine 72. To insure that the tines 70 and 72 remain mutually spaced apart, a spacer 74 extends between the tines behind the belt path 32 in a channel 76 that is not as deep as the glide path 42 and the finger guideway 45. The thickness of the spacer 74, and thus the space between the upper 70 and lower 72 tines, is equal to the thickness of the carrier belt band 12, so that the band 12 can fit between the tines as shown in FIG. 10. This insures that a tine is pushing on both the upper and lower surfaces of a sleeve during the stripping operation. The sides of both tines are beveled at the front to aid in inserting the carrier belt.

The fork 68 in its retracted position, as shown in FIG. 3, is sufficiently long to extend all the way from the back of the tool to project slightly into the belt path 32. Therefore, even in the retracted position of the fork 68, the band 12 remains threaded between the tines 70 and 72. Thus, it is not necessary to rethread the carrier belt 10 during the stripping operation until after all of the sleeves are removed from a single carrier belt.

The carriage block or sliding block 56 is designed to move forwardly in the slot 58 from its rearwardly most position to force the fork 68 along the glide path 42 through the finger guideway 45 to the position shown in FIG. 4 to force a sleeve over a substrate 78.

A pneumatic/electrical control system is used for reciprocatingly moving the fork 68. With reference to FIG. 2, an external supply tube 79 is connected at one end to the bottom of the handle 22 and at the other end to a control box 80 provided with air and electrical power inlets. The control logic for moving the fork 68 is shown in FIG. 12. The supply tube 79 contains four tubes 81, 82, 83 and 84 and electrical wires 85. The wires 85 are connected to two microswitches, a rear switch 386 and a front switch 387, as shown in FIGS. 3 and 4. The switches are mounted to the bottom 27 of the base 18 adjacent to the glide path 42 so tha the switches can be activated by the bearing 54 as it reciprocatingly moves along the glide path 42.

A three-way valve 89A is at the top of the handle 22. The valve 89A is provided with a trigger 90 that is on the outside of the handle and conveniently located for use by an operator. Only two ports of the three-way valve 89A are used. One port is supplied with air via the first tube 81. Air is discharged from the three-way valve 89A from the second port via the second tube 82. The third tube 83 supplies air to a front fitting 89, mounted on the front portion of the sidewall of the air cylinder 46. The fourth tube 84 supplies air to a rear fitting 87 mounted on the rear portion of the sidewall of the air cylinder 46.

The operation of the control logic can best be understood with reference to FIG. 12. The air supply to the box 80 passes through a filter 202 and a pressure regulator 204 set at 60 psi.

Electrical power is provided via switch 222 to a transformer 224 that converts 110 volt current to 24 volt current for operator safety. The current is provided as alternating current to a timer 226 and is converted by rectifiers 228 and 230 to DC current for the rear and front microswitches 386 and 387, and for a first solenoid valve 232 and a second solenoid valve 234.

The air is supplied via line 206 to a first four-way valve 208 and via line 210 to a second four-way valve 212, and to the first 232 and second 234 solenoid valves via lines 238 and 240, respectively.

The trigger 90 is biased so that no air passes through the three-way valve 89A. When the trigger is depressed, air passes from the first tube 81 through the three-way valve 89A to the second tube 82. A pulse valve 214 converts the long air signal to a short signal so that both four-way valves are moved to a "1-4" position. The number 4 port for the first four-way valve is closed. The number 4 port for the second 4-way valve 212 is connected to the fourth tube 84 so that air is passed to the rear fitting 87. This causes the piston rod 48 and the fork 68 to move forwardly from the position shown in FIG. 3 toward the position shown in FIG. 4. As the piston rod and the fork 68 move forwardly, the rear microswitch 386 is activated by the bearing 54.

Activation of the rear microswitch 386 causes a signal to be sent to the first solenoid valve 232 via the timer 226 and the rectifier 230. The timer takes the short electrical signal from the rear microswitch 386 and makes it sufficiently long to activate the first solenoid valve 232. The timer 236 is provided with a 10 kilohm resistor 242. The first solenoid valve 232 sends an air signal via line 244 to the "1-2" inlet port the second two-way valve 212. Because the "1-2" ports of the two four-way valves are connected to each other via line 246, the "1-2" inlet port of the second four-way valve 212 is provided with a shuttle valve 248 so that none of the air from the first solenoid valve 232 reaches the first four-way valve 208.

By the signal from the first solenoid valve 232, the first four-way valve is moved to the "1-2" position. The second port of the four-way valve is closed off. Thus, air is no longer sent via tube 84 to the rear fitting 87 of the air cylinder 46. This stops the forward movement of the piston rod 48 and the fork 68. Thus only a portion of a sleeve is removed from a finger, as shown in FIG. 1. An elongate substrate such as a wire 78 is inserted into partially removed sleeve.

Thereafter, the operator again depresses the trigger 90. This again causes the two four-way valves 208 and 212 to move to the "1-4" position, sending an air signal from the second four-way valve 212 via tube 84 to the rear fitting 87. This causes the piston rod 48 and fork 68 to restart their forward movement all the way up to the position shown in FIG. 4. This causes the remainder of the sleeve to be removed from a finger. The front microswitch 387 is activated by the bearing 54. The front microswitch sends an electrical signal to the second solenoid valve 234 which sends an output air signal via line 260 to the "1-2" ports of both four-way valves 208 and 212. This stops the second four-way valve from sending air via tube 84 to the rear fitting 87. The number 2 port of the first four-way valve 208 is connected via tube 83 to the front fitting 89 of the air cylinder 46. Thus, air is provided to the front of the air cylinder 46 and the piston rod 48 and fork 68 are moved rearwardly back to the position shown in FIG. 3.

The transformer 224, the timer 226, the resistor 242, the rectifiers 228 and 230, the solenoid valves 232 and 234, the four-way valves 208 and 212, and the pulse valve 214 are provided within the box 80.

Removing a sleeve from a finger in two stages is advantageous. When the inner diameter of the sleeve and the outer diameter of the substrate onto which the sleeve is to be mounted are close in size, it is difficult to repeatedly and reliably force a sleeve onto the substrate where the sleeve is removed from the finger in one continuous movement. By removing the sleeve only partly from a finger and using the die 24 to cause at least a portion of that part to form into a substantially cylindrical configuration, it is possible to insert the substrate 78 into the sleeve. Then, without difficulty, the rest of the sleeve can be forced from a finger.

A linkage 92 mechanically interconnects the movement of the fork 68 with the movement of the slide 38. The linkage 92, as shown in FIGS. 3 and 4, is secured to the bottom wall 27 of the base 18 by means of a cap screw 93 which extends through a hole in the linkage 92. The linkage is sandwiched between two washers 94 mounted on the cap screw 93. Below the washers 94 is a bushing 96. Mounted on the bushing 96 is a torque spring 98 having one end extending through a hole 100 in the linkage and the other end wrapped around a pin 102 mounted in the bottom of the base. The torque spring 98 acts to bias the linkage to the position shown in FIG. 4 and away from the position shown in FIG. 3.

The linkage 92 is formed so that it can contact the bearing 54 attached to the sliding block 56 at two locations as the sliding block moves reciprocatingly along the channel or slot 58. The linkage has a back contact point 110 that is contacted by the bearing 54 as the sliding block 56 reaches its rearmost position as shown in FIG. 3. The linkage 92 has an intermediate contact point 112 forward of the cap screw 93 that is contacted by the bearing 54 as the sliding block 56 reaches its forwardmost position, as shown in FIG. 4.

The forwardmost end of the linkage is above a slot 114 extending partially across the width of the bottom cover plate 36. A pin 116 extends through the forwardmost end of the liknage and through the slot 114 to engage the slide 38. As described in more detail below, as the sliding block reciprocatingly moves along the slot 58 by action of the piston rod 48, the linkage 92 causes the slide 38 to move reciprocatingly in its guide path 34.

A hole 120 is cut through the top plate 20 above the finger guideway 45 so that the markings on a sleeve in the finger guideway can be seen by the user of the tool 11. A recess is provided around the hole 120 in the top 20. A cover 122 is mounted in the recess. The cover 122 has a view slot 123 therethrough above the hole 120 for viewing a sleeve in the finger guideway 45. An optically clear plexiglass top cover 124 is secured to the cover 122 to cover the view slot 123. As shown in FIG. 10, the bottom of the top cover 124 is very close to the top of the sleeve in the finger guideway to prevent the flexible sleeve from buckling as it is stripped from a finger into the die. Preferably the bottom of the top cover 124 is spaced apart from the top tine by about 0.005 to 0.010 inch.

Mounted below the cover 122 in the hole 120 is a top feed dog assembly 126. The top feed dog assembly 126 comprises (a) a pin 128 extending from the front wall to the back wall of the hole 120, (b) a top feed dog and (c) a torque spring 134. The torque spring 134, which biases the top feed dog 130 to rotate in a counter-clockwise direction as shown in FIGS. 6–9, is rotatably mounted on the pin 128 in a recess 132 in the top feed dog 130 around the pin. The top feed dog 130 includes a downwardly extending arm 136, which by action of the torque spring 134, is caused to project into the belt path 32 adjacent the finger guideway 45. In this position, the downwardly extending arm 136 forms a guide element or sidewall for the finger guideway 45. The top feed dog 130 has a view slot 138 therethrough aligned with the view slot 123 of the cover 122 so that a sleeve in the finger guideway can be visible.

A bottom feed dog assembly 140 is provided internally in the slide 38. The bottom feed dog assembly 140 includes a pin 142 extending from the front to the back wall of the slide 38, with a bottom feed dog 144 rotatably mounted thereon. The bottom feed dog is biased by a torque spring 146 to rotate in a clockwise direction in FIGS. 6–9. The bottom feed dog 144 includes an upwardly projecting arm 148 which is biased by the torque spring 146 to extend upwardly through a slot 150 in the top of the slide 38 into the belt path 32. When the slide 38 is in the position shown in FIG. 6 adjacent to the finger guideway 45, the upwardly projecting arm 148 also forms a guide element or sidewall for the finger guideway 45. Both the downwardly extending arm 136 of the top feed dog 130 and the upwardly projecting arm 148 of the bottom feed dog 144 are sized to fit between adjacent fingers 14 of the carrier belt 10.

In operation, the tines 70 and 72 of the fork 68 pass on either side of the carrier band 12 to engage the back end of a marker sleeve 16A which is in the finger guideway 45. Sufficient room in the finger guideway needs to be provided so that the tines can pass through the finger guideway on either side of the carrier fingers 14 so that the tines and the marker sleeve 16a are not bound in the finger guideway 45. On the other hand, the height of the finger guideway between the base 18 and the top 20 must be kept to a minimum so that the tines 70 and 72 do not slip over or under a marker sleeve 16 as the tines move forward relative to the base 18. It has been found that a nominal dimension where the depth of the finger guideway is 0.012 centimeters (0.005 inch) wider then the combined nominal thickness of the tines 70 and 72 and the maximum thickness of the finger 14 for which the tool 11 is to be used, allows sufficient space for the unrestricted passage of the marker sleeve 16A and the tines 70 and 72 without allowing the tines 70 and 72 to move over or under the marker sleeve 16A.

The marker sleeves are tightly and slidably held on the carrier fingers. When the tines 70 and 72 are forced by the sliding block 56 through the finger guideway 45, the ends of the tines 70 and 72 force the marker sleeve 16A through the finger guideway 45 off of the carrier finger 14. As shown in FIG. 5, forward motion of the carrier finger 14 and the carrier belt is prevented by the rear wall of both the top feed dog 130 and the bottom feed dog 144. The top feed dog 130 is shown in phantom in FIG. 5. The top feed dog 130 and the bottom feed dog 144 can fit between adjacent fingers 14.

An important feature of the present invention is the use of the top 130 and bottom 144 feed dogs to maintain sleeves in the finger guideway 45 as the sleeves are forced off the fingers 14. As shown in FIG. 6, as sleeve 16A is forced off a finger 14, the downwardly projecting arm 136 of the top feed dog assembly 126 forms one side wall of the finger guideway 45, and the upwardly projecting arm 148 of the bottom dog assembly 140 forms the opposite side wall of the finger guideway. The side walls of the two feed dogs prevent the sleeve 16A from deviating into the belt path at it is pushed from a finger 14.

As the marker sleeve 16A is force from the forward end of the finger guideway 45 by the tines 70 and 72, it remains non-cylindrical, its relaxed configuration. In order that the marker sleeve can be pushed over a wire-like member 78, the sleeve 16A is forced into a substantially cylindrical configuration. The die 24 is provided for this function. The die 24 is positioned in front of the finger guideway 45 to receive a non-cylindrical marker sleeve 16A. The marker sleeve 16A driven by the fork 68 is forced by the die 24 into the requisite substantially cylindrical configuration. Thus, the forward motion of the fork 68 causes simultaneously a stripping of the marker sleeve 16A from a finger 14 and the distortion of the sleeve 16A into a substantially cylindrical configuration in the die 24.

The die, as best seen if FIG. 5, if formed to receive the sleeve 16A in its relaxed, non-cylindrical configuration and smoothly transform the sleeve 16A into a substantially cylindrical configuration for mounting over a wire-like member. The die, which has a block-like configuration, can be provided with a passageway on each of its faces for accommodating a variety of different sleeves. In the die 24 shown in the Figures, a passageway is provided on the top and bottom faces. The die is mounted to rotate about its longitudinal axis on a shoulder bolt 154 and locking ring 155 so that any of the faces of the die can be positioned for receiving a sleeve.

As best shown in FIGS. 2 and 12, the locking ring has four longitudinally extending "V"-shaped grooves 156 on its surface spaced apart 90° from each other. The locking ring 155 serves to lock the die into position. For this purpose, the die is provided with radially extending hole 157 in which is mounted a threaded ball detent 158 that extends radially inwardly a sufficient amount that it can engage one of the grooves 156.

With reference to FIGS. 3-5, a passageway 160 incorporates two zones, a transition zone 162 and a holding zone 164. The transition zone 162 transforms a non-cylindrical sleeve into a substantially cylindrical configuration. The transition zone incorporates two small channels 166 located on the rearward portion of the passageway 160. The small channels 166 are of sufficient size to accommodate the minor dimension of a flattened sleeve. At the rearward side of the passageway 160 the small channels 166 are spaced to insure. that the full width of the flattened sleeve is received. The small channels then converge from their first spaced relationship at the rear of the die toward the body of the die. It has been found that the small channels 166 can converge from an angle of 10 degrees to 15 degrees, and preferably 11 degrees, relative to the center line of the passageway 160 without causing buckling of an incoming marker sleeve 16. The converging nature of these small channels 166 forces the extreme edges of the non-cylindrical sleeve toward one another. This, in turn, forces the relatively flat upper and lower surfaces of the non-cylindrical sleeve to become substantially cylindrical as shown in FIGS. 1 and 5.

The holding zone 164 of the passageway 160 follows immediately from the transition zone. In the holding zone, the passageway 160 narrows down to take advantage of the natural tendency of the marker sleeves to form a true cylindrical shape. The length of the holding zone is substantially shorter (in the order of 0.05 inch) than the length of the sleeve so that only a portion of a sleeve is formed into a substantially cylindrical configuration at any one time. This minimizes the resistance against the pushing means. At the forward end of the passageway 160 is a chamber 168 adapted for insertion of a wire 78.

The operation of the tool 11 is described with reference to FIGS. 3, 4, and 6-9. With reference to FIGS. 3 and 6, at the beginning of a cycle, the piston rod 48, and thus the fork 68, are in their rearwardmost position and the slide 38 is located adjacent the finger guideway 45. The downwardly projecting arm 136 of the top feed dog 130 and the upwardly projecting arm 148 of the bottom feed dog 144 each extends between a pair of adjacent sleeves 16.

When the trigger 90 is depressed, the piston rod 48 and the fork 68 slide forwardly thereby causing the sleeve 16A to be pushed off an integral finger 14. While the sleeve 16A is being pushed, the upper and lower feed dogs serve as side walls of the finger guideway and assist in guiding the sleeve 16A over the wire 78. They also serve to prevent the carrier belt from being pushed forwardly. The linkage 92 is maintained in the position shown in FIG. 3 against the biasing force of the torque spring 98 even as the sliding block 56 moves forwardly because a detent 180 in the front wall of the slide 38 engages a ball detent 182 projecting into the guide path 34 in which the slot 38 travels. The ball detent 182 is biased by a spring 184 to project into the guide path 34.

When the piston rod 48 and the fork 68 reach the rear microswitch 386, the bearing 54 actuates the microswitch and stops the forward movement of the piston rod 48. In this position the sleeve 16A is partially open as shown in FIG. 1, allowing an operator to insert a wire 78 into the sleeve. The trigger 90 is then depressed a second time, causing the piston rod and the fork to travel to their forwardmost position. Just before the bearing 54 engages the forward microswitch 387, it engages the intermediate contact point 112 of the linkage 92. The force exerted on the linkage is sufficient to release the slide 38 from its engagement with the ball detent 182. Because of the biasing force of the torque spring 98, the linkage 92 is cause to move to the position shown in FIG. 4. This causes the slide 38 to move in the direction shown by arrow 190 in FIG. 7 to the position shown in FIG. 8. As shown in FIG. 7, as the slide moves, it passes underneath a finger 14 of the carrier belt 10. As this occurs, the bottom dog 144 rotates in a counter-clockwise direction around pin 142 so as not to interfere with movement of the slide 38. When the slide reaches the end of its slide path, as shown in FIG. 8, the upwardly projecting arm 148 of the bottom feed dog 144 is again in its upwardmost position between two adjacent fingers 14 of the carrier belt 10.

When the bearing 54 reaches and activates the forward microswitch 387, the piston rod 68 and fork 68 slide rearwardly to return to the position shown in FIG. 3. As they return, the bushing 54 engages the back contact point 110 of the linkage 92, causing the linkage to return to the position shown in FIG. 3. This causes the slide 38 to move in the direction shown by arrow 192 in FIG. 9. As the slide 38 moves, the bottom feed dog 144 pushes the entire carrier belt 10 forward in the direction shown by arrow 192 so that another finger 14 with a sleeve 16 mounted thereon is moved into the finger guideway 45. As shown in FIG. 9, the top feed dog 130 rotates in a clockwise direction about pin 128 to allow the carrier belt to be indexed forwardly. The slide 38 moves a distance equal to the pitch of the carrier belt as determined by contact with one of the screws 39.

Thus, in a complete cycle, a sleeve is placed on a wire, and the carrier belt is automatically indexed forward so that the next adjacent sleeve can be positioned on another wire.

A tool according to the present invention has many significant advantages. It is easy to use, and quickly installs sleeves on wires due to the automatic indexing feature. Because of the low resistance of the die passageways to the forward movement of sleeves, and the fact that a variety of passageways can be provided on a single die, the tool is very versatile. It can be used with sleeves of different materials and different sizes. Because the path of the slide 38 can be varied, the tool can be used with carrier belts of a variety of pitches. Thus, a single device overcomes the deficiencies of prior art devices, without loosing any of their advantages.

Although the present invention has been described in considerable detail with reference to certain preferred versions thereof, other versions are possible. For example, instead of using a pneumatic system, a hydraulic, electrical or mechanical system can be used. Furthermore, the device can be expanded so that two or more sleeves can be placed on wires simultaneously. Also, the device is not limited to use with sleeves that are initially in a flat configuration. In view of these other versions, the appended claims should not be limited to the description of the preferred versions contained herein.

What is claimed is:

1. A method for installing a non-cylindrical sleeve on an elongated substrate, the sleeve being slidably and tightly arranged in a non-cylindrical shape on a non-cylindrical holder, the method comprising the steps of:
   (a) selecting a die having opposed first and second openings;
   (b) forcing only a first part of the sleeve from the holder into the first opening of the die having a second part of the sleeve on the holder, the die forming at least a portion of the first part of the sleeve into a substantially cylindrically configuration;
   (c) stopping the step of forcing so that there is no relative movement between the sleeve and the die;
   (d) while there is no relative movement between the sleeve and the die, inserting the elongated substrate into the substantially cylindrical portion of the sleeve;
   (e) thereafter, forcing the second part of the sleeve onto the elongated substrate; and
   (f) removing the substrate with the sleeve thereon from the die through the second opening.

2. The method of claim 1 in which the step of forcing the second part of the sleeve onto the elongated substrate comprises forcing the second part of the sleeve from the holder into the die.

3. The method of claim 1 in which the die comprises a passageway that narrows from a first section that accommodates the non-cylindrical sleeve dimension to a smaller second section having a width smaller than the width of the first section for forming the sleeve into a substantially cylindrical configuration when the sleeve is forced into the die passageway.

4. The method of claim 1 in which the holder is a finger and the sleeve is one of a plurality of sleeves slideably and tightly arranged on one of a plurality of non-cylindrical fingers extending from a carrier belt, and the method includes the step of indexing the carrier belt after a sleeve is completely forced from a finger so that another sleeve can be forced from another finger.

* * * * *